United States Patent
Husar et al.

(10) Patent No.: US 9,465,719 B2
(45) Date of Patent: Oct. 11, 2016

(54) LOCALIZED REPRESENTATION OF STACK TRACES

(71) Applicant: Red Hat, Inc., Raleigh, NC (US)

(72) Inventors: Radoslav Husar, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 44 days.

(21) Appl. No.: 14/458,130

(22) Filed: Aug. 12, 2014

(65) Prior Publication Data
US 2016/0048441 A1 Feb. 18, 2016

(51) Int. Cl.
*G06F 9/44* (2006.01)
*G06F 11/36* (2006.01)

(52) U.S. Cl.
CPC ......... *G06F 11/3636* (2013.01); *G06F 9/4448* (2013.01)

(58) Field of Classification Search
None
See application file for complete search history.

(56) References Cited

U.S. PATENT DOCUMENTS

| | | | | |
|---|---|---|---|---|
| 5,909,578 | A * | 6/1999 | Buzbee | G06F 11/3466 714/E11.2 |
| 6,993,751 | B2 * | 1/2006 | Bhansali | G06F 8/44 717/137 |
| 7,225,222 | B1 | 5/2007 | Lu | |
| 7,584,216 | B2 * | 9/2009 | Travieso | G06F 17/289 |
| 7,788,648 | B2 | 8/2010 | Bossom et al. | |
| 7,818,721 | B2 * | 10/2010 | Sundararajan | G06F 11/3644 717/130 |
| 2008/0040407 | A1 | 2/2008 | Ge et al. | |
| 2011/0029822 | A1 | 2/2011 | Moser | |
| 2011/0067008 | A1 | 3/2011 | Srivastava et al. | |
| 2014/0136180 | A1 | 5/2014 | Little | |
| 2014/0258990 | A1 * | 9/2014 | Klic | G06F 11/3636 717/128 |

OTHER PUBLICATIONS

Software Clapper.org "NestedException (javautil 3.1.2 API)", Nov. 2, 2004, pp. 1-9 [online][retrieved on Dec. 7, 2015]. Retrieved from <http://software.clapper.org/javautil/api/org/clapper/util/misc/NestedException.html>.*
(John Mazzitelli) I18N Messages and Logging, Dec. 22, 2006, 8 pages, http://i8nlog.sourceforge.net/doc/users-guide.html.
(IBM) System Event Logging, 3 pages, http://www-01.ibm.com/support/knowledgecenter/SSHRKX_8.5.0/mp/trouble/adsyslog.dita, © 2014 IBM's Guide Home Page.
Java stacktrace in different locales, 2 pages http://stackoverflow.com/questions/2175593/java-stacktrace-in-different-locales, Mar. 2010.
Chapter 11 Logging, 10 pages, http://docs.jboss.org/process-guide/en/html/internationalization.html, May 2005.
The ADK Logging Toolkit, 7 pages http://docs.oracle.com/cd/E13214_01/wlintegration/v2_0/applicationintegration/deve1/4logging.htm, © 2001 BEA Systems, Inc.
Java Agent Configuration: Config File, 10 pages https://docs.newrelic.com/docs/java/java-agent-configuration, © 2008-16 New Relic, Inc.

* cited by examiner

*Primary Examiner* — Evral E Bodden
(74) *Attorney, Agent, or Firm* — Haynes and Boone, LLP (57) ABSTRACT

Systems and methods are disclosed for providing a representation of a stack trace. An example method includes identifying an element in a stack trace. The stack trace is generated based on an occurrence of an event during execution of an application. The method also includes determining whether the element has an associated annotation. The annotation is an indication to translate the element's name from a first language to a second language. The method further includes in response to determining that the element in the stack trace has the associated annotation, obtaining the element's translated name and updating the stack trace to include the element's translated name, which is in the second language.

20 Claims, 4 Drawing Sheets

206 →
```
Bootstrap.java                                    //line 1
package com.example.myproject;
@Translation("project.bootstrap")
public class Bootstrap {
@Translation("project.main")                      //line 5
public void main(String args[]) {}}
```

208 →
```
Book.java
package com.example.myproject;
@Translation("project.book")                      //line 10
public class Book {
@Translation("project.title")
public String getTitle() {...}
@Translation("project.authors")
public List<Author> getAuthors() {...}}           //line 15
```

210 →
```
Author.java
package com.example.myproject;
@Translation("project.author")
public class Author {                              //line 20
@Translation("project.booktitles")
public List<String> getBookTitles() {...}
@Translation("project.firstname")
public String firstName() {...}                   //line 25
@Translation("project.lastname")
public String lastName() {...}}                   //line 27
```

LOCALIZED REPRESENTATION OF STACK TRACES

BACKGROUND

The present disclosure generally relates to event logging in computing devices, and more particularly to providing a localized representation of a stack trace.

A system administrator may be tasked with installing and supporting various applications. For example, the administrator may be responsible for ensuring that the various applications are running correctly. To assist the administrator in monitoring an application, the application may write its status to log files, which are reviewed by the administrator. For example, messages, stack traces, thread dumps, and heap dumps may be written to the log files.

The application developer who developed the application may decide what the application will log. In an example, a log entry may have a time stamp and include a severity level to indicate the importance of the message along with the actual text of the status message. The message may be a status report written by the application to indicate what it is doing at the moment. If the application runs into an undefined state, the application may throw an exception, generate a stack trace, and write the stack trace to the application log. In an example, the application log is written to a log file. By viewing the log file, the administrator may be able to identify particular events within the application. For example, the administrator may be able to determine faults and failures within the application, which are logged in the log file.

The log file is often the sole communication interface between the administrator and the computing system. Accordingly, if an application crashes or exits unexpectedly, it is helpful for the log file to contain as much detail as possible regarding everything that led up to the crash. Additionally, it is crucial for the administrator to be able to understand the log file for timely and correct system management.

BRIEF SUMMARY

This disclosure relates to event logging in computing devices. Methods, systems, and techniques for providing a representation of a stack trace are provided.

According to an embodiment, a method of providing a representation of a stack trace includes identifying an element in a stack trace. The stack trace is generated based on an occurrence of an event during execution of an application. The method also includes determining whether the element has an associated annotation. The annotation is an indication to translate the element's name from a first language to a second language. The method further includes in response to determining that the element in the stack trace has the associated annotation, obtaining the element's translated name and updating the stack trace to include the element's translated name. The element's translated name is in the second language.

According to another embodiment, a system for providing a representation of a stack trace includes a localization system that stores one or more translation files. Each translation file includes one or more mappings from a given translation identifier that identifies a given element to a translated version of the given element's name. The system also includes a logging system that is coupled to the localization system. The logging system receives a stack trace from an application executing on a computing device, identifies an element in the stack trace, and determines whether the element has an associated annotation. The stack trace is generated based on an occurrence of an event during execution of the application, and the annotation is an indication to translate the element's name from a first language to a second language. In response to determining that the element in the stack trace has the associated annotation, the logging system obtains the element's translated name and updates the stack trace to include the element's translated name. The element's translated name is in the second language.

According to another embodiment, a non-transitory machine-readable medium includes a plurality of machine-readable instructions that when executed by one or more processors are adapted to cause the one or more processors to perform a method including: identifying an element in a stack trace, the stack trace being generated based on an occurrence of an event during execution of an application; determining whether the element has an associated annotation, the annotation being an indication to translate the element's name from a first language to a second language; and in response to determining that the element in the stack trace has the associated annotation: obtaining the element's translated name, the element's translated name being in the second language; and updating the stack trace to include the element's translated name.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the leftmost digit in the corresponding reference number.

DETAILED DESCRIPTION

I. Overview
II. Example System Architecture
  A. The Application Includes Annotated Elements
  B. The Logging Facility
  C. Generate the Stack Trace
  D. Translate Portions of the Stack Trace
  E. Provide the Localized Representation of the Stack Trace
III. Example Method
IV. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

While an application executes, it may log its status into an application log. For example, if an error occurs during execution of the application, the application may throw an exception, generate a stack trace, and write the stack trace to the application log. The application log may be written to a log destination (e.g., log file). The stack trace contains helpful information about the application's status leading up to the error. The administrator tasked with monitoring and ensuring that the application is up and running may look to the log files for guidance in understanding the inner workings of the computer system and any problems that may arise.

The administrator may be different from the application developer who developed and programmed the application. Thus, the administrator may not have the same insight as to the inner workings of the application as the developer. Additionally, the application may be written in a human language that may or may not be understood by the administrator. For example, if the application is written in English and the administrator is not a native English speaker, the administrator may have a difficult time understanding the context of the error. For example, the stack trace inherently includes names of classes and methods expressed in that human language (e.g., English). It may be desirable to localize this information so that the administrator has an easier time in reading and understanding the stack trace. For example, by translating a class name and/or a method name in the stack trace into a language that the administrator understands, the administrator may more easily understand the function of the class and/or method and the context of the problem.

To ease the administrator's understanding of the computer system and problems within the application, it may be desirable to provide localized messages to the administrator. A localized message may be a message that is translated from the original human language in which it is written into a human language that is understood by the administrator. A message may be an element, which may be, for example, a class or a method at the source code level of the application. A localized version of the information contained in the original message may then be printed into an application/server log for the administrator to review.

The present disclosure introduces techniques to improve the administrator's experience with understanding log files and in particular, stack traces. As will be explained further below, the developer may annotate elements in the application to indicate that the annotated elements in the application are to be localized and translated into another human language. The developer may decide which elements in the application to annotate. In an example, the application developer annotates all of the methods and classes. In another example, the application developer annotates a subset of the methods and/or classes.

In an example, a method of providing a representation of a stack trace includes identifying an element in a stack trace. The stack trace may be generated based on an occurrence of an event during execution of an application. The method also includes determining whether the element has an associated annotation. The annotation is an indication to translate the element's name from a first language to a second language. The method further includes in response to determining that the element in the stack trace has the associated annotation, obtaining the element's translated name and updating the stack trace to include the element's translated name, where the element's translated name is in the second language.

II. Example System Architecture

Figure 1:
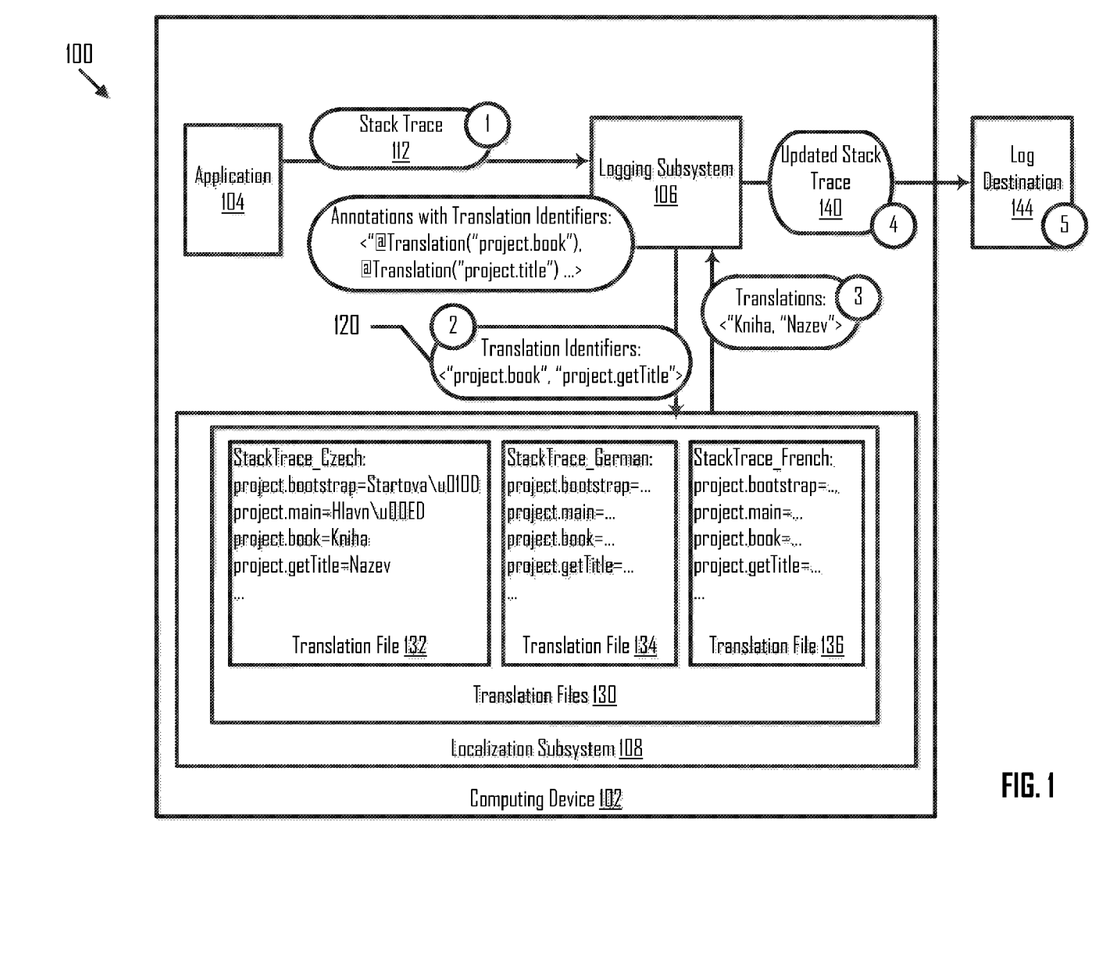
FIG. 1 is a block diagram illustrating a system for providing a representation of a stack trace, according to an embodiment.

FIG. 1 is a block diagram 100 illustrating a system for providing a representation of a stack trace, according to an embodiment. Diagram 100 includes a computing device 102. Computing device 102 may be a workstation, computer, server, game console, set-top box, kiosk, embedded system, mobile device (e.g., a mobile phone, personal digital assistant, tablet, and laptop), or other device having at least one processor and memory.

Computing device 102 includes an application 104, logging system 106, and localization system 108. Each of application 104, logging system 106, and localization system 108 may be implemented on a computing device that includes a memory and a processor. Additionally, each of application 104, logging system 106, and localization system 108 may be coupled to a network. For example, each of application 104, logging system 106, and localization system 108 may be implemented on different computing devices and may be separated by the network. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and Hypertext Transfer Protocol (HTTP), and various combinations of the foregoing.

A. The Application Includes Annotated Elements

Computing device 102 executes an application 104 that is written in a high-level programming language. In an example, application 104 is written in an object-oriented programming language that defines classes. A data object may be a self-contained entity that has state and behavior and represents an instance of a class. The data object's state may be described as its fields and properties, and the data object's behavior may be described by its methods. Application 104 may include code that creates objects of a class, and an object of a particular class may expose methods and properties defined by that class.

At the source code level of application 104, application 104 includes one or more elements. An element may be, for example, a class or a method. The developer of application 104 may annotate one or more elements at the source code level of application 104 to indicate that the name of the annotated element should be translated into another language (e.g., a local language that is understood by the administrator). The elements are the context information, and the element names are translated from a first language to a second language. The second language may be a local language of the location of computing device 102.

Figure 2:
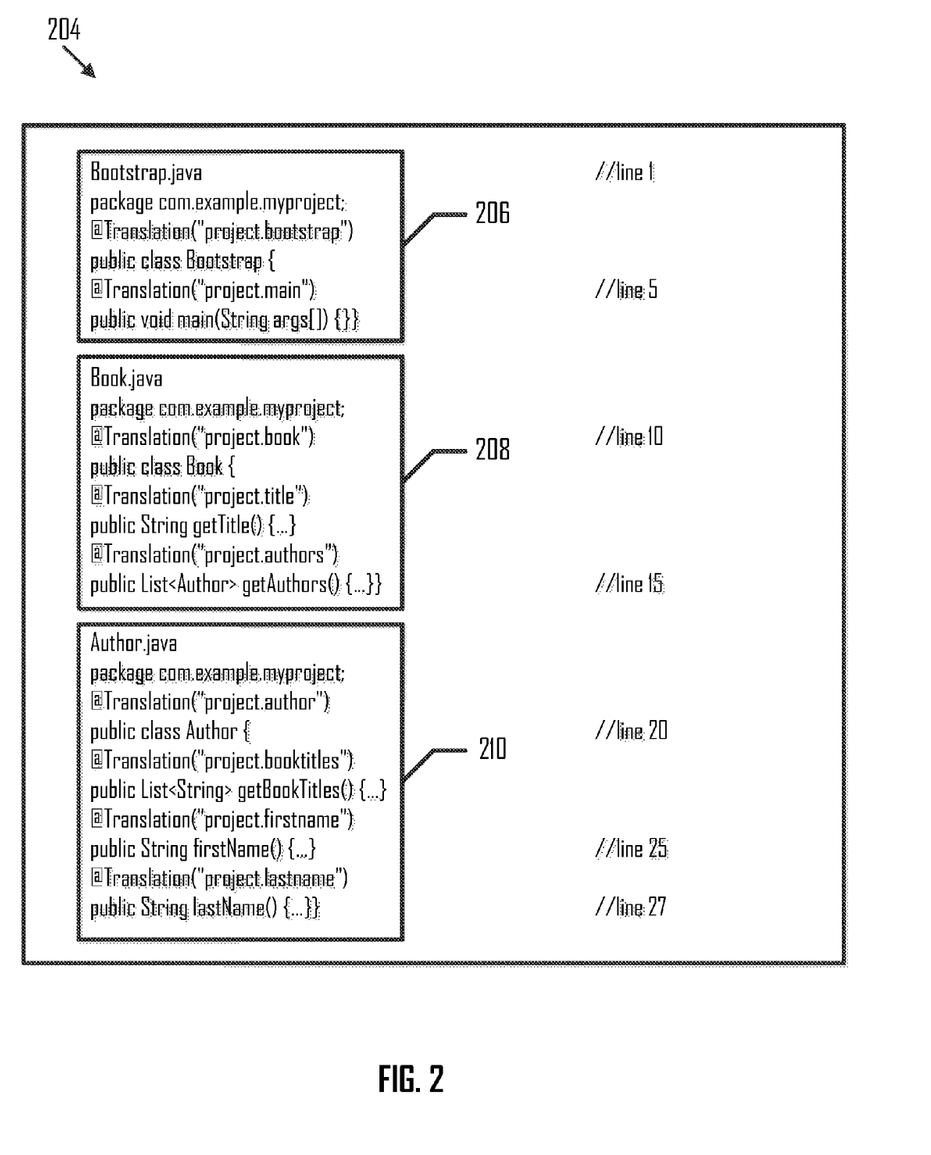
FIG. 2 is example source code of an application including multiple annotated elements, according to an embodiment.

FIG. 2 is example source code 204 of application 104 including multiple annotated elements, according to an embodiment. In the example illustrated in FIG. 2, application 104 is a Java® application. Java is a common programming language that is selected by large enterprises for their web applications. The Java application may run within an application server container such as, for example, Tomcat®, Jetty®, Websphere, or JBoss®. In such an example, application 104 is written in the Java programming language and runs in a Java Virtual Machine (JVM®). The JVM is an environment in which the Java application executes. Trademarks are the properties of their respective owners.

Example source code 204 includes a Bootstrap class, Book class, and Author class. An annotation may be preceded by one or more symbols or characters. In example source code 204, an annotation is preceded by the symbol "@". Each annotation may include a translation identifier that identifies the annotated element. The translation identifier may uniquely identify the annotated element. As will be explained in more detail below, the translation identifier identifies the annotated element and provides a connection between the source code of application 104 (e.g., name of class or method) and the element's translated name (e.g., translated element name in a translation file). Accordingly, the translation identifier may be used to obtain the translated version of the annotated element's name.

In FIG. 2, a "Bootstrap.java" file 206 includes a class element "Bootstrap" starting at line 4 and a method element "main" starting at line 6 of example source code 204. Class element "Bootstrap" and method element "main" are annotated elements. In particular, an annotation "@Translation ("project.bootstrap")" at line 3 is the annotation for the class element "Bootstrap" to indicate that the name of the element ("Bootstrap") should be translated from a first language (e.g., English) to a second language (e.g., Czech) and also includes the translation identifier "project.bootstrap." Additionally, an annotation "@Translation("project.main")" at line 5 is the annotation for the method element "main" to indicate that the name of the element ("main") should be translated from the first language to the second language and also includes the translation identifier "project.main."

A "Book.java" file 208 includes a class element "Book" starting at line 11 and method elements "getTitle" starting at line 13 and "getAuthors" starting at line 15 of example source code 204. Class element "Book" and method elements "getTitle" and "getAuthors" are annotated elements. In particular, an annotation "@Translation("project.book")" at line 10 is the annotation for the class element "Book" to indicate that the name of the element ("Book") should be translated from the first language to the second language and also includes the translation identifier "project.book." Additionally, an annotation "@Translation("project.title")" at line 12 is the annotation for the method element "getTitle" to indicate that the name of the element ("getTitle") should be translated from the first language to the second language and also includes the translation identifier "project.title." Additionally, an annotation "@Translation("project.authors")" at line 14 is the annotation for the method element "getAuthors" to indicate that the name of the element ("getAuthors") should be translated from the first language to the second language and also includes the translation identifier "project.authors."

An "Author.java" file 210 includes a class element "Author" starting at line 20 and method elements "getBookTitles" starting at line 22, "firstName" starting at line 24, and "lastName" starting at line 26 of example source code 204. Class element "Author" and method elements "getBookTitles", "firstName", and "lastName" are annotated elements. In particular, an annotation "@Translation("project.author")" at line 19 is the annotation for the class element "Author" to indicate that the name of the element ("Author") should be translated from the first language to the second language and also includes the translation identifier "project.author."

Additionally, an annotation "@Translation("project.bookTitles")" at line 21 is the annotation for the method element "getBookTitles" to indicate that the name of the element ("getBookTitles") should be translated from the first language to the second language and also includes the translation identifier "project.bookTitles." Additionally, an annotation "@Translation("project.firstname")" at line 23 is the annotation for the method element "firstName" to indicate that the name of the element ("firstName") should be translated from the first language to the second language and also includes the translation identifier "project.firstname." Additionally, an annotation "@Translation("project.lastname")" at line 25 is the annotation for the method element "lastName" to indicate that the name of the element ("lastName") should be translated from the first language to the second language and also includes the translation identifier "project.lastname."

B. The Logging Facility

Referring back to FIG. 1, as application 104 executes on computing device 102, application 104 may write its status to one or more application logs. For example, the application may log events such as errors, changes in application configuration, unexpected behavior, component startup or shutdown, user logins, data changes, class instantiations, method calls, and more.

Computing device 102 includes a logging system 106 that is used by application 104 to log its events. For example, application 104 may be a Java application that writes its status to a log file using the log4j adapter. In an embodiment, logging system 106 is a library that provides an interface to application 104 and computing device 102. Logging system 106 may be thought of as an abstraction and may represent a "logging facility". Logging system 106 may provide an application programming interface (API) that abstracts the underlying logging implementation. In an example, application 104 instantiates an object that represents the logging facility and calls a method on the logger object to log an event. Logging system 106 may also have an application inside of it.

Different logging levels of the logging facility are available. In an example, the different logging levels may include the trace logging level (least important of the logging events), debug logging level (used for extra information that helps with debugging), info logging level (used for every day logging messages), warn logging level (used for recoverable issues, or where the suspicions of a wrong setting/ nonstandard behavior happens), error logging level (used for exceptions, actual errors, and things that are important to know), and fatal logging level (most important of the logging events).

The administrator may format and structure the messages. The administrator may configure the logging framework to filter based on the logging level which messages should be logged and/or displayed. The administrator may also configure a log destination of the messages. A log destination may be, for example, a log file, terminal console, database, and/or remote server.

If something goes wrong, application 104 may throw an exception and generate a stack trace 112. For example, if application 104 has trouble connecting to a remote system, application 104 may generate an error message that is accompanied by a context message (e.g., stack trace 112). The error message may indicate that an error occurred during network communication (e.g., network connection was refused exception) and the context message may identify in which part of application 104 this exception was thrown. The administrator may review the context message to identify which part of application 104 was unable to connect to the remote system and thus ascertain what should be fixed. If an exception is thrown inside application 104, the exception is sent to logging system 106, which writes the stack trace to the application log.

The error message may be translated from a first language to a second language. For example, if the error message is written in English, the error message may be translated to Czech and written to the application log in Czech. In such an example, the application log may contain the English version of the error message and/or the Czech version of the error version. In addition to the error message being translated, context information of the message may also be translated. For example, names of elements in stack trace 112 may be translated from the first language to the second language to provide the administrator with more context regarding what caused the exception to be thrown.

C. Generate the Stack Trace

During execution of application 104, application 104 may generate stack trace 112 based on an occurrence of an event. In an example, if an error occurs during the execution of application 104, application 104 generates stack trace 112. Table A illustrates an example of stack trace 112, which may be generated by application 104 in relation to example source code 204 in FIG. 2.

TABLE A

Exception in thread 'main' java.lang.NullPointerException
at com.example.myproject.Book.getTitle(Book.java:16)
at com.example.myproject.Author.getBookTitles(Author.java:25)
at com.example.myproject.Bootstrap.main(Bootstrapjava:14)

In the example stack trace illustrated in Table A, an exception was thrown within application 104. The example stack trace contains important information on application 104's status before the exception was thrown. The first people to see the exceptions are typically not the application developers who know the classes and methods and developed the software code, but the people administrating the system. Thus, it is important for the administrator to understand the stack trace.

The stack trace identifies a portion of application 104's source code to which the event that generated the stack trace is associated. By reviewing the stack trace, the administrator may identify which classes were instantiated and/or which methods were called before the exception was thrown. In particular, the administrator may identify the actual software code of the classes and methods because the original names of the classes and methods are retained in the stack trace. For example, the line with the most recent method call that is part of application 104 is "at com.example.myproject.Book.getTitle(Book.java:16)". The administrator may read this line and open up the "Book.java" file 208 and look at line 16 of the class. Similarly, the administrator may read the second line of the example stack trace (at com.example.myproject.Author.getBookTitles(Authorjava:25)) and open up the "Author.java" file 210 and look at line 25 of the class. Similarly, the administrator may read the third line of the example stack trace (at com.example.myproject.Bootstrap.main(Bootstrap.java:14)) and open up the "Bootstrap.java" file 206 and look at line 14 of the class.

D. Translate Portions of the Stack Trace

Logging system 106 receives stack trace 112 from application 104 executing on computing device 102. Portions of stack trace 112 may be translated to provide the administrator with context information that is understandable. In an embodiment, logging system 106 parses stack trace 112 to determine which element names in the stack trace should be translated into another language. Logging system 106 identifies a set of elements in the stack trace and determines whether each element of the set of elements has an associated annotation, where the annotation is an indication to translate the respective element's name from a first language to a second language. The set of elements may include one or more elements.

In response to determining that an element in the stack trace does not have an associated annotation, logging system 106 writes the original element name to the application log and continues down stack trace 112. In contrast, in response to determining that the element in the stack trace has an associated annotation, logging system 106 obtains the element's translated name and updates the stack trace to include the element's translated name, where the element's translated name is in a language different from the language used in the original stack trace (e.g., stack trace 112) generated by application 104.

For one or more annotated elements of the set of elements, logging system 106 may obtain the annotated element's translated name. In an example, logging system 106 identifies the translation identifier in the annotation and sends a request 120 for the element's translated name to localization system 108, where request 120 includes the translation identifier. Request 120 may include one or more of the annotated elements.

Using the example stack trace in Table A as an example, logging system 106 reads the line "at com.example.myproject.Book.getTitle(Book.java:16)" and identifies the class element "Book" and the method element "getTitle". Logging system 106 determines that both elements have an associated annotation at the source code level of application 104 (see example source code 204 in FIG. 2). In particular, the annotation for the class element "Book" is "@Translation("project.book")", and the annotation for the method element "getTitle" is "@Translation("project.title")", as illustrated in FIGS. 1 and 2.

Logging system 106 identifies translation identifier "project.book" in the annotation for the class element "Book" and which identifies the class element "Book". Logging system 106 also identifies translation identifier "project.title" in the annotation for the method element "getTitle" and which identifies the method element "getTitle." Logging system 106 may send request 120 including these translation identifiers (e.g., "project.book" and "getTitle") to localization system 108. Request 120 is a request for the translated names of the one or more element's identified by the translation identifiers. In particular, request 120 is a request for a translation of the class element name "Book" and a translation for the method element name "getTitle." Responsive to request 120, logging system 106 may obtain the one or more element's translated names.

Localization system 108 may receive request 120 and determine whether it can provide the requested translation. Computing device 102 includes an operating system (not shown) in which the locale of computing device 102 may be set. The locale specifies a language in which to translate one or more element names. The administrator set up the locale to specify particular language(s). Based on the locale, localization system 108 determines to which language to translate the element's name identified by the translation identifier in request 120. For example, if the locale of computing device 102 is in the Czech Republic, localization system 108 may obtain this information from the operating system and determine that the one or more element's name as provided in the original stack trace should be translated to Czech. In this example, the computing device 102 is described as being located in the Czech Republic and the administrator is described as being a native Czech speaker. In another example, if the locale of computing device 102 is Germany, the language specified by may be German. In another example, if the locale of computing device 102 is France, the language specified may be French. It should be understood that other locales may be used and may specify other languages.

The administrator at the locale is typically knowledgeable in the language specified by the locale. It may be the case, however, that the administrator has stronger language skills in a language different from the default language. In our global economy, many people move to other parts of the world. For example, an administrator living in Germany may be more fluent in Czech than in German. In such an example, although computing device 102 may be located in Germany, the administrator may set the language specified by the locale to Czech and override the default of German. Although localization system 108 is described as determining the locale of computing device 102 and the language specified by the locale, this is not intended to be limiting and application 104 or logging system 106 may determine the locale of computing device 102 and/or the language specified by the locale.

The language specified by the locale is the language to which the element names are to be translated. Logging system 106 includes a set of translation files 130 containing one or more translation files that may provide translated names for annotated elements identified by the translation identifiers in a translation request. In an example, application 104 is a Java application and set of translation files 130 is a Java Resource Bundle. In such an example, set of translation files 130 may be part of application 104 running in the JVM. As such, the localized stack traces may be generated directly from the JVM.

Localization system 108 determines whether the translation file corresponding to the language specified by the locale is available. Set of translation files 130 includes a translation file "StackTrace_Czech" 132, translation file "StackTrace_German" 134, and translation file "StackTrace_ French" 136. Translation file "StackTrace_Czech" 132 provides a Czech translation of one or more element names, translation file "StackTrace_German" 134 provides a German translation of one or more element names, and translation file 136 "StackTrace_French" provides a French translation of one or more element names. Each of the translation files of set of translation files 130 may provide, for example, a translated version of one or more of the annotated elements in the source code of application 104.

Each of the translation files in set of translation file 130 includes one or more entries, where an entry includes a mapping from a translation identifier that identifies an annotated element to the translated version of the element's name. In an example, persons knowledgeable in a particular language may be provided with the element names and may provide the proper translation for the element names in the particular language. In another example, the element names are fed into a program that provides the proper translation for the element names in the particular language.

In response to determining that the appropriate translation file (e.g., the translation file corresponding to the language specified by the locale) is available, localization system 108 searches for the translation identifier in the appropriate translation file. If localization system 108 identifies the translation identifier in the appropriate translation file, localization system 108 may identify the translated element name to which the translation identifier maps, where the translated element name is in the language specified by the locale.

For example, translation file "StackTrace_Czech" 132 includes the translation identifier "project.book", which identifies the class element "Book." The translation identifier "project.book" maps to "Kniha", which is the Czech translation of the class element name "Book". Additionally, translation file "StackTrace_Czech" 132 includes the translation identifier "project.getTitle", which identifies the method element "getTitle". The translation identifier "getTitle" maps to "Nazev", which is the Czech translation of the method element name "getTitle". Other embodiments may provide different ways to map element names (e.g., class or method names) to a translated version of the element's name.

In another example, if localization system 108 does not find the translation identifier in the translation file, localization system 108 may send an empty string back to logging system 106 to inform logging system 106 that the translation file does not have a translation for the element's name identified by the translation identifier in request 120. In another example, if localization system 108 does not find the translation identifier in the translation file, localization system 108 sends a request to logging system 106 for the element's name to be translated, and logging system 106 may send the element's name to logging system 106. Localization system 108 may send a request including the element's name to a translation service to obtain the translated version of the element's name identified by the translation identifier in request 120. The translation service may receive localization system 108's request, translate the element's name, and send the translated version of the element's name back to localization system 108. Localization system 108 may in turn provide the translated version of the element's name to logging system 106, which uses the element's translated name to update stack trace 112.

E. Provide the Localized Representation of the Stack Trace

Localization system 108 provides the one or more translated element names to logging system 106 so that logging system 106 can update stack trace 112. Logging system 106 generates an updated stack trace 140 by updating stack trace 112 to include the one or more element's translated names. Logging system 106 may update stack trace 112 by inserting the one or more element's translated names into stack trace 112. In an example, logging system 106 inserts the one or more element's translated names on a same line as the original element's name in stack trace 112, where the original element's name is in a first language (e.g., English), and the element's translated name is in a second language (e.g., Czech) that is different from the first language.

The text in stack trace 112 may be a subset of the text in updated stack trace 140. Updated stack trace 140 is enriched with localization information that may enable the administrator to more easily monitor and fix any problems that arise in the system. Logging system 106 may output updated stack trace 140 to a log destination 144, where updated stack trace 140 includes the one or more element's translated names. Log destination 144 may be, for example, a terminal console, a log file, a database, and/or a remote server. Accordingly, when the administrator reviews updated stack trace 140, the administrator will see the translated element names.

Table B illustrates an example of updated stack trace 140, which may be generated by logging system 106 and based on stack trace 112.

TABLE B

Exception in thread 'main' java.lang.NullPointerException{NULOVA REFERENCE}
at com.example.myproject.Book{KNIHA}.getTitle {NAZEV}(Book.java:16)
at com.example.myproject.Author{SPISOVATE}.getBookTitles{SEZNAM KNIH}(Author.java:25)
at com.example.myproject.Bootstrap{STARTOVAC}.main{HLAVN}(Bootstrap.java:14)

In the example updated stack trace illustrated in Table B, the inserted translated element names are within curly braces and are capitalized. The translated version of the class element "Book", KNIHA, is wrapped in left and right curly braces characters, and the translated version of the method element "getTitle", NAZEV, is also wrapped in left and right curly braces characters. This is not intended to be limiting and the logging system 106 may insert the translated element names into stack trace 112 in a variety of ways.

Logging system 106 may insert the translated element names into stack trace 112 in such a way that they are clearly denoted as not part of the element. Accordingly, the administrator may be able to determine the concrete classes and methods that caused the problem and may clearly grasp in the administrator's preferred language what the actual problem in stack trace 112 is. The administrator may review updated stack trace 140 (rather than stack trace 112). If the administrator chooses, both stack trace 112 and updated stack trace 140 may be output.

As discussed above and further emphasized here, FIGS. 1 and 2 are merely examples, which should not unduly limit the scope of the claims. For example, although translation files are illustrated as being stored in computing device 102, this is not intended to be limiting and translation files may be stored remotely. In another example, logging system 106 may be installed in computing device 102 or in a remote device. Further, although computing device 102 is illustrated as including one application, it should be understood that computing device 102 may include one or more applications.

Additionally, a locale may specify one or more languages. The administrator may configure the locale to specify multiple languages. In an example, logging system 106 provides an updated stack trace for each of the specified languages. In such an example, logging system 106 may provide a first updated stack trace including element names that are translated from English to Czech and a second updated stack trace including element names that are translated from English to French.

In another example, the administrator ranks the multiple languages such that localization system 108 searches set of translation files 130 based on the ranking. For example, the administrator may configure the locale to specify Spanish, French, and German, where Spanish has a higher ranking than French and German, and French has a higher ranking than German. Localization system 108 may first search for a translation file that provides Spanish translations of element names. If the translation file that provides Spanish translations of element names is found, the localization system 108 may use that translation file. If, however, the translation file that provides Spanish translations of element names is not found, localization system 108 may search for a translation file that provides French translations of element names, which is translation file 136 in FIG. 1.

If localization system 108 uses translation file 136 and is unable to find a translation identifier in request 120 (see FIG. 1), localization system 108 may identify the next language below French in the ranking, which in this example is German. Localization system 108 may search for a translation file that provides German translations of element names, which is translation file 134. Localization system 108 searches translation file 134 for the translation identifier that was not found in translation file 136. If localization system 108 finds the translation identifier, localization system 108 may identify the German version of the element name identified by the translation identifier and provide the German version of the element name. In such an example, localization system 108 may specify the language to which an element name is translated. For example, for a French version of an element name, localization system 108 may attach a "FR" to the element name, and for a German version of an element name, localization system 108 may attach a "GE" to the element name.

III. Example Method

Figure 3:
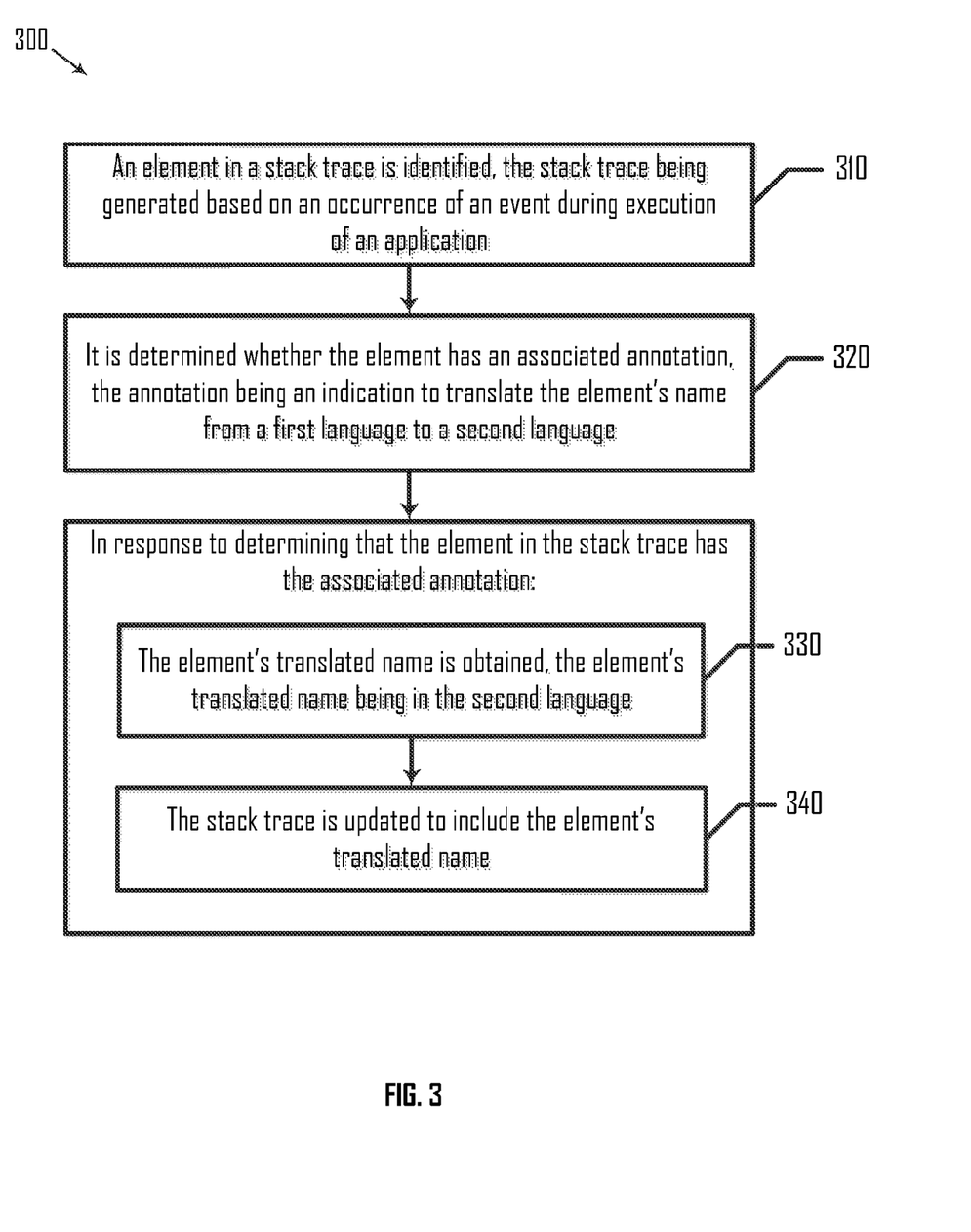
FIG. 3 is a flowchart illustrating a method of providing a representation of a stack trace, according to an embodiment.

FIG. 3 is a flowchart illustrating a method 300 of providing a representation of a stack trace, according to an embodiment. Method 300 is not meant to be limiting and may be used in other applications.

Method 300 includes blocks 310-340. In a block 310, an element in a stack trace is identified, the stack trace being generated based on an occurrence of an event during execution of an application. In an example, logging system 106 identifies an element in stack trace 112, which is generated based on an occurrence of an event during execution of application 104. In an example, the event that causes application 104 to generate stack trace 112 is an exception that is thrown or an error that occurs while application 104 is executing. The element in stack trace 112 may be, for example, a class or a method in the source code of application 104.

In a block 320, it is determined whether the element has an associated annotation, the annotation being an indication to translate the element's name from a first language to a second language. In an example, logging system 106 determines whether the element has an associated annotation. If the element is a class, the annotation is an indication to translate the class's name from the first language (e.g., English) to another language (e.g., Czech). If the element is a method, the annotation is an indication to translate the method's name from the first language to another language. The application developer may decide which elements to annotate and inserts annotations for those elements.

In response to determining that the element in the stack trace has the associated annotation, the actions in blocks 330 and 340 may be performed. In a block 330, the element's translated name is obtained, the element's translated name being in the second language. In an example, logging system 106 obtains the element's translated name, which is in a language different from the language used in the original stack trace. Logging system 106 may obtain the element's translated name by determining a locale of a computing device that is executing application 104, where the locale specifies a language in which to translate one or more annotated element names. Logging system 106 may determine whether a translation file corresponding to the language specified by the locale is available, where the translation file includes one or more mappings from a given translation identifier that identifies a given element to a translated version of the given element's name. In response to determining that the translation file corresponding to the language specified by the locale is available, logging system 106 may identify the translation identifier in the translation file and obtain the element's translated name to which the translation identifier maps. The element's translated name is in the language specified by the locale.

In a block 340, the stack trace is updated to include the element's translated name. In an example, logging system 106 updates stack trace 112 to include the element's translated name. Logging system 106 may generate updated stack trace 140 by inserting one or more translated names into stack trace 112. In an example, logging system 106 updates stack trace 112 by inserting one or more translated names on a same line as the original element's name stack trace 112.

It is also understood that additional processes may be performed before, during, or after blocks 310-340 discussed above. It is also understood that one or more of the blocks of method 300 described herein may be omitted, combined, or performed in a different sequence as desired.

IV. Example Computing System

Figure 4:
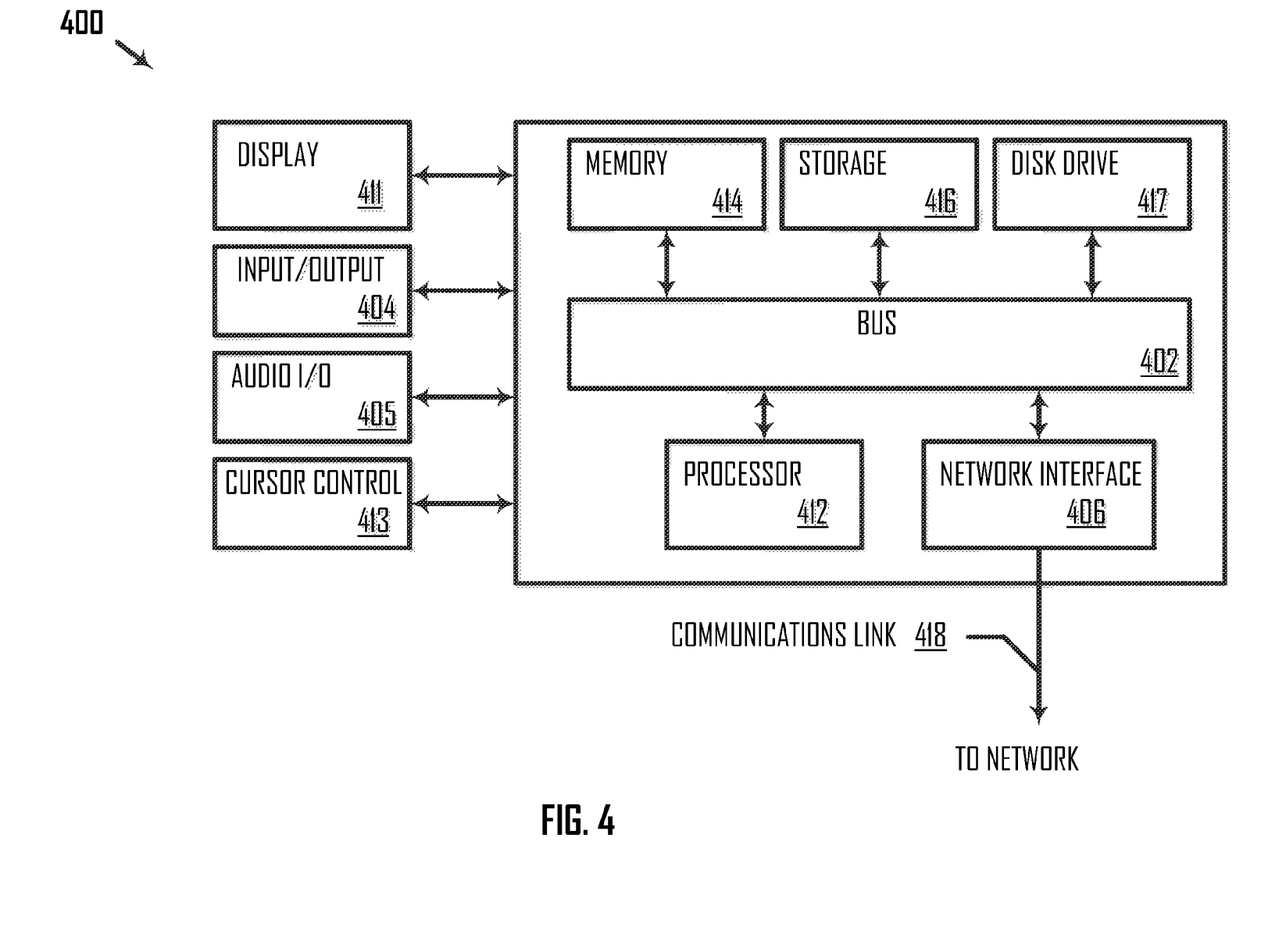
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, computing device 102 may include one or more processors and may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the computing device using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.). In an example, log destination 144 is display 411, and updated stack trace 140 is displayed on display 411.

An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable. If localization system 108 is located in a device that is remote from computing device 102, logging system 106 may retrieve the translation versions of elements names over the network via communication link 418.

A processor 412, which may be a micro-controller, digital signal processor (DSP), or other processing component, processes these various signals, such as for display on display 411 coupled to computer system 400 or transmission to other devices via communication link 418. Processor 412 may also control transmission of information, such as cookies or IP addresses, to other devices. Components of computer system 400 also include a system memory component 414 (e.g., RAM), a static storage component 416 (e.g., ROM), and/or a disk drive 417.

Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 300) to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various actions or blocks described herein may be changed, combined into composite actions or blocks, and/or separated into sub-actions or sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of providing a representation of a stack trace, comprising:
   identifying an element in a stack trace, the stack trace being in a first language and generated based on an occurrence of an event during execution of an application, the application including the element;
   determining whether the element has an associated annotation, the annotation being an indication in the application to translate the element's name from the first language to a second language different from the first language; and
   in response to determining that the element in the stack trace has the associated annotation:
      obtaining the element's translated name, the element's translated name being in the second language; and
      updating the stack trace to include the element's translated name.

2. The method of claim 1, further including:
   outputting the updated stack trace to a log destination, the updated stack trace including the element's translated name.

3. The method of claim 1, wherein the updating the stack trace includes inserting the element's translated name on a same line as the element's name in the stack trace, the element's name being in the first language, and the application being written in the first language.

4. The method of claim 1, wherein the annotation includes a translation identifier that identifies the annotated element, the method further including:
   identifying the translation identifier in the annotation; and
   sending a request for the element's translated name, the request including the translation identifier, wherein the element's translated name is obtained responsive to the request.

5. The method of claim 4, wherein the annotation includes a translation identifier that identifies the annotated element, the method further including:
   determining a locale of a computing device that is executing the application, the locale specifying a language in which to translate one or more element names;
   determining whether a translation file corresponding to the language specified by the locale is available, the translation file including one or more mappings from a translation identifier to an element name in the language;
   in response to determining that the translation file corresponding to the language specified by the locale is available:
      identifying the translation identifier in the translation file; and
      identifying the element's translated name to which the translation identifier maps, the translated element name being in the language specified by the locale; and
      providing the element's translated name.

6. The method of claim 1, wherein the stack trace identifies a portion of the application's source code to which the event is associated.

7. The method of claim 6, wherein the event is an exception that is thrown within the application.

8. The method of claim 6, wherein the element is a class in the source code level.

9. The method of claim 6, wherein the element is a method of a class in the source code level.

10. A system for providing a representation of a stack trace, comprising:
    a localization system that stores one or more translation files, wherein each translation file includes one or more mappings from a given translation identifier that identifies a given element to a translated version of the given element's name; and
    a logging system coupled to the localization system, wherein the logging system receives, by one or more processors, a stack trace from an application executing on a computing device, identifies an element in the stack trace, and determines whether the element has an associated annotation, wherein the stack trace is in a first language and generated based on an occurrence of an event during execution of the application, the annotation is an indication in the application to translate the element's name from the first language to a second language different from the first language, and the application includes the element,
    wherein in response to determining that the element in the stack trace has the associated annotation, the logging system obtains the element's translated name and updates the stack trace to include the element's translated name, and wherein the element's translated name is in the second language.

11. The system of claim 10, wherein the logging system outputs the updated stack trace to a log destination.

12. The system of claim 10, wherein the logging system inserts the element's translated name on a same line as the element's name in the stack trace.

13. The system of claim 10, wherein the annotation includes a translation identifier that identifies the annotated element.

14. The system of claim 11, wherein the localization system determines a locale of a computing device that is executing the application and the locale specifies a language in which to translate one or more element names.

15. The system of claim 14, wherein the localization system determines whether a translation file corresponding to the language specified by the locale is available, wherein in response to determining that the translation file corresponding to the language specified by the locale is available, the localization system identifies the translation identifier in the translation file, identifies the element's translated name to which the translation identifier maps, and provides the element's translated name to the logging system, and wherein the translated element name is in the language specified by the locale.

16. The system of claim 10, wherein the element is a class in at a source code level of the application.

17. The system of claim 10, wherein the element is a method of a class at a source code level of the application.

18. A machine-readable medium comprising a plurality of machine-readable instructions that when executed by one or more processors is adapted to cause the one or more processors to perform a method comprising:
- identifying an element in a stack trace, the stack trace being in a first language and generated based on an occurrence of an event during execution of an application, the application including the element;
- determining whether the element has an associated annotation, the annotation being an indication in the application to translate the element's name from the first language to a second language different from the first language; and
- in response to determining that the element in the stack trace has the associated annotation:
  - obtaining the element's translated name, the element's translated name being in the second language; and
  - updating the stack trace to include the element's translated name.

19. The machine-readable medium of claim 18, wherein the element is a class or a method of the class at a source code level of the application.

20. The method of claim 1, wherein data in the stack trace is a subset of data in the updated stack trace, and the class's translated name is inserted into the stack trace adjacent to the identified element in the stack trace.

* * * * *